May 28, 1968          J. PARKER          3,385,195
AIR INLET FOR ANIMAL HOUSES AND THE LIKE
Filed Sept. 29, 1966          2 Sheets-Sheet 1
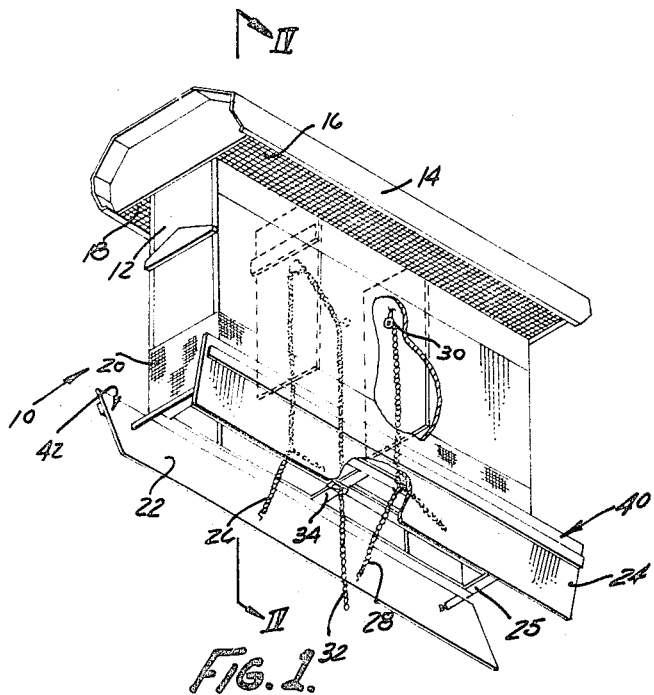
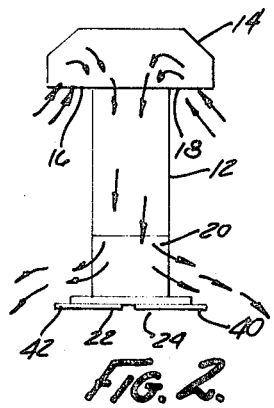
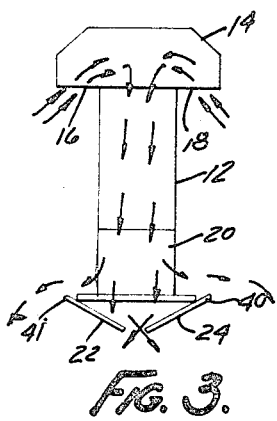
INVENTOR.
JACK PARKER
BY
ATTORNEYS May 28, 1968  J. PARKER  3,385,195

AIR INLET FOR ANIMAL HOUSES AND THE LIKE

Filed Sept. 29, 1966  2 Sheets-Sheet 2

INVENTOR.
JACK PARKER
BY
ATTORNEYS

United States Patent Office 3,385,195
Patented May 28, 1968

3,385,195
AIR INLET FOR ANIMAL HOUSES AND THE LIKE
Jack Parker, Holland, Mich., assignor to Big Dutchman Inc., Zeeland, Mich., a corporation of Michigan
Filed Sept. 29, 1966, Ser. No. 582,921
5 Claims. (Cl. 98—40)

ABSTRACT OF THE DISCLOSURE

A ventilator for mounting on the roof of an animal house is disclosed and comprises a housing extending through the roof with a "T" shaped canopy member at the upper portion providing an outside air inlet. At the lower portion of the housing an air inlet into the animal house is provided with pivoted damper plates beneath the inlet providing a baffling effect on the air flow so as to prevent direct downdrafts of air.

---

This invention relates to air inlets or ventilators, and more particularly to ventilators which are used in animal houses to provide the necessary circulation of air about the animals in such a house or building.

The acute need for proper ventilation of animal houses is well established as of the present time, and is now recognized almost everywhere extremely important for the raising of healthy animals. Fresh air from outside the animal houses must be brought inside, but it is of utmost importance that there be no direct drafts of air, since even moderate drafts have been found to be deleterious to the health of the animals and to make them susceptible to diseases. Consequently, a problem is raised as to supplying adequate amounts of cool fresh air from outside the building without creating any undesired drafts.

In previous U.S. Patents Nos. 3,138,086 and 3,174,-423, assigned to the assignee of the present invention, ventilators or air inlets are disclosed which for the most part provide a satisfactory solution to the basic underlying of supplying large enough quantities of air. However, it has been determined that even the use of such devices as these can result in undesired downward drafts of cool or cold air.

It has been determined that the aforesaid drafts are caused largely by the lack of a means for counteracting the inherent tendency of cool air to settle straight downwardly after having been introduced into the normally warm animal houses or the like. Consequently, it is a major object of the present invention to provide an air inlet or ventilator structure by which fresh air may be introduced into an ainmal house in the desired quantities, but which structure further includes a baffle arrangement by which the incoming fresh air is directed laterally and there dispersed, so that the likelihood of a draft is substantially eliminated. The air inlet of the invention is, moreover, quickly and simply regulated and adjusted so that a desired degree of ventilation may be provided in any given weather situation, whether winter or summer. Further, the air inlet is characterized by maximum strength and simplicity of design so as to be economically producible and saleable to the individual farmer or animal raiser, and so as to provide for long and continuous satisfactory service.

The foregoing major objects of the invention and the advantages provided thereby, together with other objects and advantages equally a part thereof, will become increasingly apparent following consideration of the ensuing specification and its appended claims, particularly when taken in conjunction with the accompanying illustrative drawings setting forth a preferred embodiment of the invention.

In the drawings:

FIG. 1 is a lateral perspective view of the novel inlet structure, showing some of the undersurface thereof;

FIG. 2 is a schematic representation of the air inlet, showing air flow therethrough under a first condition;

FIG. 3 is a schematic representation of the air inlet, showing air flow therethrough under a second condition;

Briefly stated, the present invention is an improvement of the similar air inlets disclosed and claimed in previous U.S. Patents Nos. 3,138,086 and 3,174,423, particularly the latter. The invention provides an air inlet housing forming a vertically extending duct means having an upper opening with a canopy thereover and having portions at its lower extremities defining openings through which fresh air has entered the duct means at the top may flow to reach the inside of the animal house. A baffle means is located at the bottom of the aforesaid duct means, beneath the said openings. This baffle means extends laterally of the perimeter of the housing which forms the duct means an amount sufficient to direct the air flowing through the said openings in a lateral direction relative to the duct means. This directs and disperses the incoming air, and thus precludes the occurrence of undesired downdraft channels of air.

Figure 4:
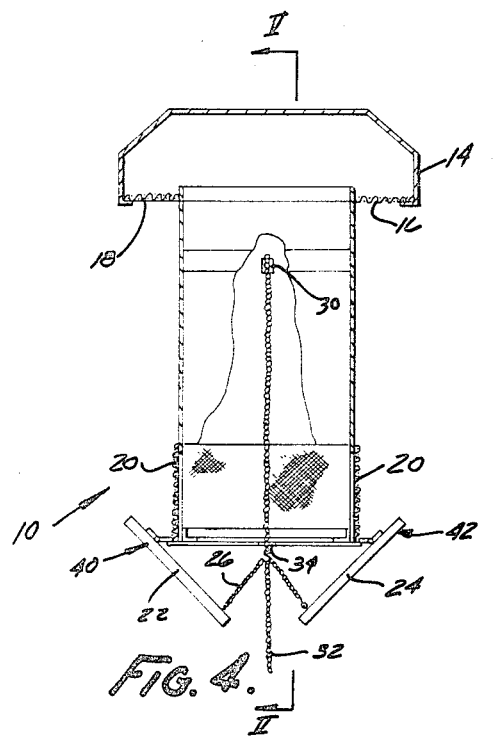
FIG. 4 is an enlarged central sectional end elevation taken through the vertical plane IV—IV of FIG. 1.
Figure 5:
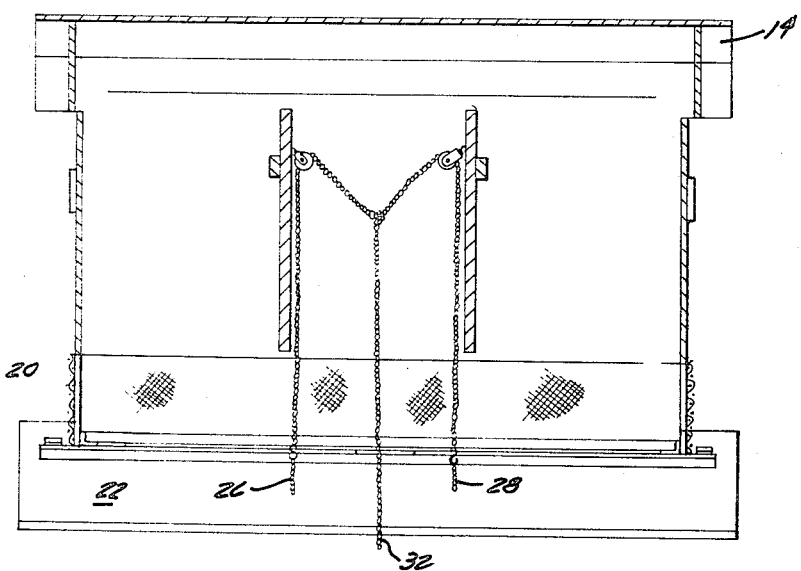
FIG. 5 is an enlarged central sectional side elevation of the structure of FIGS. 1 and 4, taken through the plane V—V of FIG. 4.

Referring now in more detail to the drawings, the structural details of the present air inlet structure 10 may be understood by examining FIGS. 1, 4, and 5. An upright, generally rectangular housing 12 defines a vertically-extending duct means, about half of which normally extends outwardly from the top of the roof of an animal house, while about half usually extends downwardy through the roof, into the animal house. The housing 12 is open at the top, and a canopy 14 is attached to the housing so as to extend over the said opening, to provide a roof which will keep rain, snow and other foreign materials or objects out of the interior of the animal house.

The canopy 14 extends laterally beyond each side of the housing 12 to provide air inlet openings 16 and 18 which lie along opposite sides of the housing 12 near the top thereof, beneath the overhanging edges of the canopy 14. The air inlet openings 16 and 18 are preferably covered with screening or other desired mesh to prevent insects, birds, and night-flying creatures from entering the duct means defined by the housing 12 and thus coming inside the animal house being ventilated.

The housing 12 is open at its bottom extremities to provide an outlet for the fresh air traveling through the housing duct from the outside. A porous member 20 such as the plastic known commercially as "Lumite" is attached to the housing 12 at its bottom extremity. This tube provides what is in effect an extension of the duct means formed by the housing. A pair of shutter-like doors 22 and 24 are upon appropriate frame 25 which may be secured directly to the mesh member itself. The doors 22 and 24 are preferably pivoted or hinged upon the frame 25, so that they may be swung between a fully opened and a fully closed position.

A tension member such as a chain 26 or 28 is attached to each of the doors 22 and 24. The chains 26 and 28 extend upward over pulleys 30 mounted to the inside of the housing 12, after which the chains are connected to a master or control chain 32. By this arrangement, a downward pull on the control chain 32 pulls each of the pivotally mounted doors 22 and 24 towards each other, to close the opening at the bottom of the porous or mesh member 20. Conversely, releasing the control chain 32 allows the weight of the doors to pivot them toward an open position. It is to be noted that since the frame 25 and the doors 22 and 24 hinged thereupon are attached to the bottom portion of the mesh tube 20, additional downward pulling on the control chain 32 after the doors have been fully closed, will pull the closed doors upwardly against the bottom of the frame 25, thereby elevating both the doors and the frame together and collapsing the mesh tube 20 upwardly against the bottom of the housing 12. Thus, while it is possible for outside air to enter the air inlet openings 16 and 18 located beneath the canopy 14 and pass downwardly through the duct means and outwardly through the openings in the porous mesh tube 20 even during such times as the doors 22 and 24 may be fully closed, it is nonetheless possible to collapse the mesh tube so that substantially no air can move through it into the inside of the animal house, thereby completely closing off the inlet structure. As is indicated in FIG. 1, the frame 25 preferably includes a central cross-member 34, and this member has an aperture therein, through which the control or master chain 32 passes as it leaves the interior of the inlet structure. This aperture has a necked-down lateral portion in which any link in the control or master chain 32 may be caught to hold the doors 22 and 24 at any desired degree of relative opening or closing.

An important part of the present invention is the presence of a baffle means 40, 42 located at the bottom of the duct means defined by the housing 12 and beneath the mesh tube 20. As FIGS. 1 and 4 illustrate, these baffle means are preferably comprised of outwardly-extending portions of the two shutter-like doors 22 and 24, and the baffle means so comprised are of a size to extend laterally outwardly well beyond the point where the doors are connected to the frame 25. The baffle means further extend laterally well beyond each end of the said frame. Thus, it will be seen that the aforesaid baffles extend laterally beyond each point on the perimeter of the mesh tube 20.

The purpose of the baffle means 40 and 42 will be understood by examining FIGS. 2 and 3, which schematically show the paths taken by fresh air from the outside which is entering the inlet structure of the invention beneath the canopy 14 and passing downwardly through the duct means formed by the housing 12. In FIG. 2, the doors 22 and 24 have been pivoted to a position in which they close the bottom of the mesh tube 20 at the lower extremity of the housing 12. Under these circumstances, air entering the inlet openings 16 and 18 flows beneath the canopy and downwardly through the duct formed by the housing 12 until it reaches the closed doors 22 and 24 at the bottom thereof. At this point, the air travels laterally out of the inlet structure through the openings in the porous mesh tube 20 at the bottom.

While the screen-like mesh in the tube 20 filters this air and disperses it to some extent, it has been discovered that without the presence of the baffle means 40 and 42 at the outward extremities of the doors 22 and 24, the incoming air would, after passing through the mesh tube, drop straight downward into the animal house, thereby forming a chilling downdraft. When baffle means such as 40 and 42 are provided, however, the incoming air is directed laterally over the baffles in all directions away from the inlet structure. This serves to break up the column of incoming air and disperse it over a wide area, thereby substantially eliminating the downdraft which would otherwise exist. This operation of the baffle means naturally occurs regardless of the extent to which the mesh tube may be collapsed upwardly toward a closed position, as set forth hereinabove.

The baffle means of the invention operate in a similar manner when the doors 22 and 24 are in a partially opened position, as occurs with the approach of warmer weather. That is, as seen in FIG. 3, even with the doors 22 and 24 pivoted upon their hinge mountings to a partially open condition so that some of the air moving downward through the housing 12 may pass directly through the bottom of the housing between the partially open doors, a sizeable quantity of air will nonetheless pass out of the housing by moving laterally through the mesh tube 20. All such air will impinge on the angularly raised baffle means 40 and 42, and will thus be deflected upwardly and outwardly from the inlet structure with a dispersion effect that is much the same as that seen in FIG. 2. Also, much of the air which does travel straight downwardly through the housing duct means will impinge angularly against the partially opened doors and will thus glance off the upper surfaces of the doors, to travel through the opening therebetween at an angle. This angularly-traveling air off each door interacts with the air moving straight downwardly through the opening between the doors, and a turbulence is thereby created between the doors which also tends to eliminate a direct downdraft of air.

It is entirely conceivable that upon examining the foregoing disclosure, those skilled in the art may devise embodiments of the concept involved which differ somewhat from the embodiments shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

I claim:
1. An air inlet apparatus for mounting through the roof of an animal house, comprising: a housing forming a vertically-extending duct means; said duct means having an opening at its upper extremities for communication with the air outside said house; a canopy member mounted upon said housing above said upper opening; said duct means having a portion at its lower extremities defining side openings through which air in said duct means may flow to the inside of said house; said duct means at its lower extremity defining a bottom opening located below said side openings and facing downwardly; and a baffle plate means at the bottom of said duct means covering said bottom opening and beneath said side openings; said baffle plate means extending at least somewhat laterally beyond both sides of said duct means and directing said air flowing out of said side openings laterally of said duct means, thereby dispersing said flow and precluding undesirable direct downdraft channels of air.

2. The air inlet apparatus of claim 1, wherein said portion at the lower extremities of said duct means comprises a porous member defining a plurality of said side openings.

3. The air inlet apparatus of claim 2, wherein said porous member is a mesh tube providing in effect an extension of said duct means.

4. The air inlet apparatus of claim 3, wherein said baffle means extends laterally beyond the perimeter of said tube.

5. The air inlet apparatus of claim 1, wherein said baffle plate means comprise a pair of shutter-like doors mounted for hinging movement at the bottom of said tube to provide for varying the degree of closure of said main opening.

References Cited

UNITED STATES PATENTS

| | | | |
|---|---|---|---|
| 2,396,025 | 3/1946 | Seid | 98—40 |
| 3,138,086 | 6/1964 | Rigterink et al. | 98—37 |
| 3,174,423 | 3/1965 | Rigterink et al. | 98—37 X |

ROBERT A. O'LEARY, *Primary Examiner.*

W. E. WAYNER, *Assistant Examiner.*

UNITED STATES PATENT OFFICE
CERTIFICATE OF CORRECTION

Patent No. 3,385,195                          May 28, 1968

Jack Parker

It is certified that error appears in the above identified patent and that said Letters Patent are hereby corrected as shown below:

In the heading to the printed specification, lines 3 and 4, "assignor to Big Dutchman Inc., Zeeland, Mich., a corporation of Michigan" should read -- assignor, by mesne assignments, to U. S. Industries, Inc., New York, N. Y., a corporation of Delaware --.

Signed and sealed this 20th day of January 1970.

(SEAL)
Attest:

Edward M. Fletcher, Jr.

Attesting Officer

WILLIAM E. SCHUYLER, JR.

Commissioner of Patents